United States Patent Office 2,819,326
Patented Jan. 7, 1958

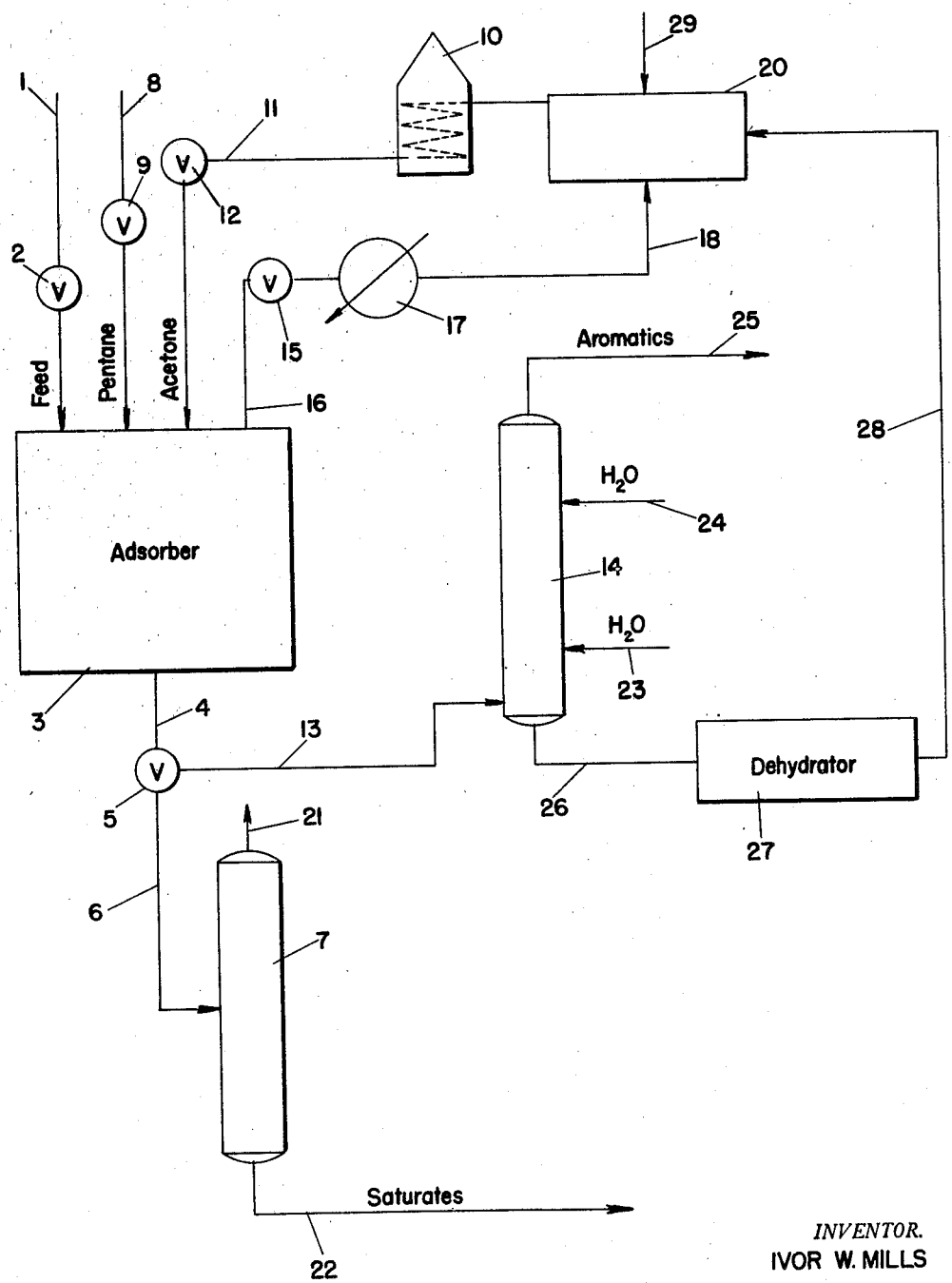

2,819,326
AROMATICS SEPARATION PROCESS

Ivor W. Mills, Glenolden, Pa., assignor to Sun Oil Company, Philadelphia, Pa., a corporation of New Jersey Application November 14, 1955, Serial No. 546,323

14 Claims. (Cl. 260—674)

This invention relates to a process for separating aromatic from saturate hydrocarbons, and more particularly to an improved cyclic adsorption-desorption process in which a low-boiling, water-soluble, highly polar compound such as acetone is used as the desorbent for removing adsorbed aromatics from an adsorbent such as silica gel.

Cyclic processes for separation of aromatics from saturates by the adsorption technique have been known for some time, such as, for example, the Arosorb process described in Petroleum Processing, vol. 10, No. 8, page 1201. Such processes involve passing a feed stock through a bed of adsorbent, which has previously been contacted with a desorbing fluid, until the capacity of the adsorbent for feed aromatics has been substantially exhausted, while withdrawing from the adsorbent a stream of feed saturates mixed with desorbent, which may boil above or below the feed, depending on the boiling range of the latter. Flow of feed to the adsorbent is then cut off, and a stream of desorbent is passed over the adsorbent until the major part of the feed aromatics have been dislodged from the adsorbent while a stream comprising feed aromatics and desorbent is separately collected. The saturate stream and aromatic stream are then subjected to separate distillations to take overhead desorbent or product, as the case may be, and to recover purified feed saturates and aromatics. Adsorption processes of this type are effective to separate aromatics from saturates in feeds ranging from gasoline hydrocarbons to oils of lubricating viscosity, whereas extractive process, such as the Udex process, are economical only in treating low-boiling feeds, due to the excessive amount of solvent required to process higher molecular weight fractions. When used for processing low-boiling feeds, however, adsorption processes have been at an economic disadvantage compared to extractive processes due to the large heat load required to distill the product or the desorbent, as the case may be, from both the saturate and aromatic fractions recovered from the adsorber case.

It is an object of this invention to provide an adsorption process for the separation of a hydrocarbon feed stock into aromatic-rich and saturate-rich fractions in which the heat load required to free the aromatic and saturate fractions from desorbent is substantially less than that required in hitherto known adsorption processes.

In accordance with my invention, the feed stock is passed through a bed of material which preferentially adsorbs the aromatic constituents thereof, such as silica adsorbs the aromatic constituents thereof, such as silica gel, activated charcoal, and the like, until the capacity of the adsorbent for feed aromatics is substantially exhausted. Flow of feed is then stopped, and a small amount of a light saturate such as pentane or butane is admitted to the adsorbent case to flush out the feed saturates in the interstitial spaces of the adsorbent. A hot low boiling, water-soluble desorbent, which is more strongly adsorbed on the adsorbent than the feed aromatics, such as acetone, methanol, or acetaldehyde, is then admitted to the adsorber case, sufficient pressure being maintained to keep the desorbent in liquid phase. The desorbent should be heated to a temperature high enough that its heat content is sufficient to vaporize completely, at atmospheric pressure, any desorbent left in the adsorber case at the end of each cycle of operation. Sufficient desorbent is passed over the adsorbent to dislodge most of the feed aromatics, at which time the pressure in the adsorber case is dropped to allow the desorbent contained therein to vaporize and leave the adsorbent in condition to start another adsorption-desorption cycle. The vaporized desorbent is condensed and returned to the process.

The effluent from the adsorbent case during each cycle is divided into two portions. The first portion to issue consists of feed saturates, which gradually become mixed with pentane as the cycle proceeds. This portion of the effluent is separately collected and is subjected to distillation to recover pentane overhead and feed saturates as bottoms. The second portion of effluent to issue from the adsorber case will comprise feed aromatics, a small amount of pentane, and desorbent. This portion is taken to an extraction tower in which it is treated with a small amount of water, say from 2 to 10%; causing separation of the portion into a hydrocarbon phase and an aqueous desorbent phase. The two phases are separated, and the hydrocarbon phase is distilled to remove pentane overhead, leaving feed aromatics as bottoms. The equeous desorbent phase is taken to a dehydrator, in which it is contacted with a drying agent such as calcium chloride, calcium sulfate or alumina gel. Dry desorbent is recovered from the dehydrator, and is recycled to the process.

As may be observed from the foregoing description, the only heat required for distillation is that required to vaporize the small amount of pentane which was admitted to the adsorber case to act as a wedge between the feed saturates and the feed aromatics. Some additional heat is also required to recondition the dehydrating agent when its capacity to absorb water has been exhausted, but since only minor quantities of water are used, this heat load is not excessive. Since at the completion of each cycle the desorbent is vaporized from the adsorbent, the saturate fraction recovered from the adsorber case will contain no desorbent, and therefore no treatment is necessary for desorbent recovery from this fraction.

In order that those skilled in the art may more fully appreciate the nature of my invention and the means for carrying it out, an example will be more fully described in connection with the accompanying drawing which is a diagrammatic flow sheet of a preferred form of my new process.

Referring now to the drawing, a catalytic reformate boiling between 160° F. and 240° F., containing about 40% aromatics, which has previously been heated to 220° F., is taken through line 1 and valve 2, under a pressure sufficient to maintain it in liquid phase, to adsorber case 3, which is packed with silica gel. In passing through adsorber case 3 the feed aromatics will be adsorbed on the gel, and the saturates will pass through case 3 and will be recovered through line 4 and valve 5, which at this time is so positioned as to conduct the saturates through line 6 to distillation tower 7.

After the capacity for aromatics of the gel in adsorber case 3 has been substantially exhausted, valve 2 is closed and pentane, which has also been previously heated to the same temperature as the feed, is introduced to adsorber case 3 through line 8 and valve 9. The pentane, in passing down through the adsorber, displaces the feed saturates contained in the interstitial spaces between the gel particles. It will be understood that sufficient pressure will be maintained in adsorber 3 during this stage of the operation to maintain the pentane in liquid phase. When aromatics first appear in line 4 along with the feed saturates, valve 9 is closed and acetone, which has been previously heated to a temperature of about 220° F. in heater 10, is admitted to adsorber case 3 through line 11 and valve 12, pressure in the adsorber during this operation rising to about 80 pounds per square inch. At this time valve 5 is switched to pass the effluent through line 13 to treating tower 14. The passage of acetone is continued through adsorber case 3 until such time as all of the feed aromatics have been displaced from the adsorbent. At this time valve 12 is closed and valve 15 in off-take line 16 is opened so as to reduce the pressure in adsorber case 3 to atmospheric. Reduction of the pressure in this manner will cause the acetone remaining in adsorber case 3 to boil off; such vaporization being aided by the latent heat of the adsorbent. The vapors of acetone are conducted through line 16 and valve 15 to condenser 17, in which the acetone is reconverted to the liquid phase. The liquid acetone is taken through line 18 to acetone storage 20, for recycle to the system.

The saturate fraction of the effluent which was conducted through line 6 to fractionator 7 is therein distilled to take overhead pentane through line 21, a purified saturate stream being removed as bottoms through line 22. The aromatic fraction of the effluent which was carried through line 13 to separation tower 14 is therein treated with a small amount of water introduced through lines 23 and 24. The water introduced through line 23 will cause the hydrocarbon acetone mixture to break into an aqueous acetone phase and a hydrocarbon phase containing a minor amount of dissolved acetone. The water introduced through line 24 serves to wash out the dissolved acetone, to yield a substantially acetone-free hydrocarbon product which is removed overhead through line 25. The hydrocarbon product may be subjected to a finishing treatment to remove any pentane or traces of acetone contained therein, to yield a final aromatic product of high purity.

The aqueous acetone phase is removed from separation tower 14 through line 26 and is taken to a dehydrator 27, which may be packed with a dehydrating chemical such as calcium chloride, calcium sulfate, or alumina gel. It will be understood by those skilled in the art that although but one dehydrator is shown in the drawing two dehydrators will be employed in parallel, so that one of them may be undergoing regeneration while the other is onstream. From dehydrator 27 dry acetone is removed through line 28 and is taken to acetone storage 20. Make-up acetone may also be introduced to storage 20 through line 29.

In the operation of my process on the feed given above the feed will be introduced to the adsorber case during each cycle in the amount of 0.07 gallon per pound of silica gel. Pentane will be used in the amount of 0.01 gallon per pounds of gel and acetone will be used in the amount of 0.08 gallon per pound of gel. It will be understood, of course, that when operating on feeds of other types, containing more or less aromatics, the above proportions may vary considerably, and the operator of the process must determine for himself what are the optimum quantities to be used in each phase of the cycle. When processing a higher-boiling, more viscous feed, it may be advisable to add a low-boiling aromatic, such as benzene or toluene, to the acetone in order to dilute the feed aromatics and facilitate their removal from the adsorbent.

While the process as outlined above is operable to produce saturate and aromatic fractions of reasonably high purity, if it is desired to produce aromatics and saturates of better than 99% purity it may be advisable to separate a third fraction from the effluent between the saturate fraction and the aromatic fraction, to treat this third fraction to recover pentane and acetone and to recycle the feed components to the process. Under ordinary circumstances, however, the pentane wedge will provide an adequate separation of feed saturates and feed aromatics.

While, for the purpose of simplifying the drawing and description, a process using but one adsorber case has been shown, in commercial practice two or more adsorber cases may be used, each operating at a different phase of the cycle, in order to smooth out the flow of products to fractionator 7 and separation tower 14, to render the process continuous in these pieces of apparatus. Alternatively, if only one adsorber case is to be used, product storage tanks should be interposed in lines 6 and 13, to accomplish the same purpose.

In connection with the drawing, an isothermal process was described in which all process streams fed to the adsorber case were heated to the same temperature. This is possible when the desorbent is low-boiling, and has a low latent heat of vaporization, such as is the case with acetone, since the process can be operated at a temperature at which the gel will adsorb feed aromatics efficiently, and the heat content of the adsorber case will still be sufficient to completely evaporate the desorbent on release of pressure. When a desorbent having a higher latent heat of vaporization, such as methanol, is used, it will be more satisfactory to operate at lower temperatures during the first part of the cycle to take advantage of the increased capacity of silica gel for aromatics at these temperatures, and to heat only the desorbent to a temperature sufficiently high to insure vaporization of that portion thereof which is left in the adsorber case at the end of each cycle.

As before stated, by proceeding according to the present invention almost all of the heat necessary for product fractionation in an adsorbent process for separating aromatics from saturates has been eliminated, thus making the process economically competitive with extraction type processes for treating low-boiling hydrocarbon feeds, and also lowering process costs when processing high-boiling feeds.

I claim:

1. A cyclic process for the separation of aromatic hydrocarbons from saturate hydrocarbons which comprises, during each cycle, passing a feed stock comprising aromatic and saturate hydrocarbons through an adsorber case containing a bed of adsorbent on which feed aromatics are preferentially absorbed until the capacity of the adsorbent for aromatics has been substantially exhausted, separately collecting a stream comprising feed saturates during this portion of the cycle, shutting off flow of feed to the adsorbent and passing thereto a low-boiling, water soluble desorbent which is more strongly adsorbed on the adsorbent than the feed aromatics, said desorbent being heated to a temperature such that it will vaporize substantially completely from the adsorbent at atmospheric pressure, maintaining sufficient pressure in the adsorber case to maintain the desorbent in liquid phase, continuing passage of desorbent through the adsorbent until the feed aromatics have been substantially completely desorbed therefrom while separately collecting a stream comprising feed aromatics and desorbent; then reducing the pressure in the adsorber case to a pressure at which desorbent in the case will substantially completely vaporize; collecting and condensing desorbent vapors, conducting said stream comprising feed aromatics and desorbent to a separation zone and therein contacting it with sufficient water to cause the stream to break into a hydrocarbon phase and an aqueous desorbent phase, separately collecting the hydrocarbon phase and the desorbent phase, dehydrating the desorbent, and recycling it to the process.

2. The process according to claim 1 in which the adsorbent is silica gel.

3. The process according to claim 2 in which the desorbent is acetone.

4. The process according to claim 2 in which the desorbent is methanol.

5. A cyclic process for the separation of aromatic hydrocarbons from saturate hydrocarbons which comprises, during each cycle, passing a feed stock comprising aromatic and saturate hydrocarbons through an adsorber case containing a bed of adsorbent on which feed aromatics are preferentially adsorbed until the capacity of the adsorbent for aromatics has been substantially exhausted, shutting off flow of feed to the adsorbent and passing therethrough a sufficient quantity of a saturate hydrocarbon boiling below the feed to displace the feed saturates held in the interstitial spaces of the desorbent, collecting a stream comprising feed saturates during the foregoing portions of the cycle; shutting off flow of said low-boiling saturate hydrocarbon and passing through the adsorbent a low-boiling, water-soluble desorbent which is more strongly adsorbed on the adsorbent than the feed aromatics, said desorbent being heated to a temperature such that it will vaporize substantially completely from the adsorbent at atmospheric pressure, maintaining sufficient pressure in the adsorber case to maintain the desorbent in liquid phase, continuing passage of desorbent through the adsorbent until the feed aromatics have been substantially completely desorbed therefrom while separately collecting a stream comprising feed aromatics and desorbent, then reducing the pressure in the adsorber case to a pressure at which desorbent in the case will substantially completely vaporize; collecting and condensing desorbent vapors, conducting said stream comprising feed aromatics and desorbent to a separation zone and therein contacting it with sufficient water to cause the stream to break into a hydrocarbon phase and an aqueous desorbent phase, separately collecting each phase, dehydrating the desorbent, and recycling it to the process.

6. The process according to claim 5 in which the adsorbent is silica gel.

7. The process according to claim 6 in which the desorbent is acetone.

8. The process according to claim 6 in which the desorbent is methanol.

9. The process according to claim 7 in which the low-boiling saturate hydrocarbon is pentane.

10. A cyclic process for the separation of aromatic hydrocarbons from saturate hydrocarbons which comprises, during each cycle, the steps of passing a feed stock comprising aromatic and saturate hydrocarbons through an adsorber case containing a bed of adsorbent on which feed aromatics are preferentially adsorbed until the capacity of the adsorbent for aromatics has been substantially exhausted, shutting off flow of feed to the adsorbent and passing therethrough a sufficient quantity of a saturate hydrocarbon boiling below the feed to displace the feed saturates held in the interstitial spaces of the desorbent, collecting a stream comprising feed saturates during the foregoing portions of the cycle, shutting off flow of said low-boiling saturate hydrocarbon and passing through the adsorbent a low boiling, water-soluble desorbent which is more strongly adsorbed on the adsorbent than the feed aromatics, in an amount sufficient to displace substantially completely the feed aromatics from the desorbent, while separately collecting a stream comprising feed aromatics and desorbent, maintaining the temperature in the adsorber case during at least the latter part of the foregoing portion of the cycle at a value at which the desorbent will substantially completely vaporize from the adsorbent at atmospheric pressure, and maintaining the pressure at a value high enough to maintain the feed, low-boiling hydrocarbon, and desorbent in liquid phase, then reducing the pressure in the adsorber case to a pressure at which desorbent remaining in the case will substantially completely vaporize, collecting and condensing desorbent vapors, conducting said stream comprising feed aromatics and desorbent to a separation zone and therein contacting it with sufficient water to cause the stream to break into a hydrocarbon phase and an aqueous desorbent phase, separately collecting each phase, dehydrating the desorbent, and recycling it to the process.

11. The process according to claim 10 in which the adsorbent is silica gel.

12. The process according to claim 11 in which the desorbent is acetone.

13. The process according to claim 11 in which the desorbent is methanol.

14. The process according to claim 12 in which the low-boiling hydrocarbon is pentane.

References Cited in the file of this patent

UNITED STATES PATENTS

| 2,376,425 | Frey | May 22, 1945 |
|---|---|---|
| 2,390,536 | Houdry et al. | Dec. 11, 1945 |
| 2,702,826 | Kirshenbaum et al. | Feb. 22, 1955 |

OTHER REFERENCES

Mair et al.: "Journal of Research of the National Bureau of Standards," vol. 32, pages 165–183 (April 1944), pages 165–167 and 176–178 relied on.